United States Patent [19]
Wright

[11] Patent Number: 6,040,352
[45] Date of Patent: Mar. 21, 2000

[54] FREE RADICAL POLYMERIZATION PROCESS USING A MONOCHROMATIC RADIATION SOURCE

[75] Inventor: Robin E. Wright, Inver Grove Heights, Minn.

[73] Assignee: 3M Innovative Properties Company, Saint Paul, Minn.

[21] Appl. No.: 09/096,005

[22] Filed: Jun. 11, 1998

[51] Int. Cl.$^7$ .................................................. C08F 2/46
[52] U.S. Cl. .................................. 522/2; 522/14; 522/63; 522/120; 522/182
[58] Field of Search ................................. 522/2, 120, 14, 522/182, 63, 8

[56] References Cited

U.S. PATENT DOCUMENTS

| | | | |
|---|---|---|---|
| 4,262,072 | 4/1981 | Wendling et al. | 430/14 |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,737,559 | 4/1988 | Kellen et al. | 526/291 |
| 4,748,043 | 5/1988 | Seaver et al. | 427/30 |
| 4,885,332 | 12/1989 | Bilkadi | 524/714 |
| 5,073,611 | 12/1991 | Rehmer et al. | 526/208 |
| 5,091,483 | 2/1992 | Mazurek et al. | 525/477 |
| 5,128,386 | 7/1992 | Rehmer et al. | 522/35 |
| 5,202,483 | 4/1993 | Rehmer et al. | 564/207 |
| 5,248,805 | 9/1993 | Boettcher et al. | 558/270 |
| 5,264,533 | 11/1993 | Rehmer et al. | 526/301 |
| 5,294,688 | 3/1994 | Rehmer et al. | 526/260 |
| 5,326,598 | 7/1994 | Seaver et al. | 427/473 |
| 5,389,699 | 2/1995 | Rehmer et al. | 522/35 |
| 5,504,391 | 4/1996 | Turner et al. | 313/570 |
| 5,686,793 | 11/1997 | Turner et al. | |

FOREIGN PATENT DOCUMENTS

| | | |
|---|---|---|
| WO 94/14853 | 7/1994 | WIPO . |
| WO 96/00740 | 1/1996 | WIPO . |
| WO 97/39837 | 10/1997 | WIPO . |
| WO 97/40090 | 10/1997 | WIPO . |

OTHER PUBLICATIONS

Kitamura et al., Applied Surface Science, 79/80 (1994), 507–513.
Kogelschatz et al., ABB Review, 3 (1991), 21–28.
Kogelschatz et al., Applied Surface Science, 54 (1992), 410–423.
Zhang et al., Journal of Adhesion Science and Technology, 8(10) (1994), 1179–1210.
A.F. Jacobine and S.T. Nakos, "Photopolymerizable Silicone Monomers, Oligomers, and Resins," Radiation Curing Science and Technology, (1992) Plenum: New York, 200–214.
R. Nagarajam et al., Radtech Report, Jul./Aug. 1997, 26–30.
Heraeus, Excimer–UV–Sources, Aug. 1993.

*Primary Examiner*—James J. Seidleck
*Assistant Examiner*—Sanza L. McClendon
*Attorney, Agent, or Firm*—John A. Burtis; Melanie Gover

[57] ABSTRACT

A method of preparing an adhesive composition that includes exposing a free-radically polymerizable pre-adhesive composition to a monochromatic radiation source having a peak intensity at a wavelength falling within the range of about 250 nanometers to about 600 nanometers to polymerize the pre-adhesive composition and form the adhesive composition.

33 Claims, No Drawings

FREE RADICAL POLYMERIZATION PROCESS USING A MONOCHROMATIC RADIATION SOURCE

FIELD OF THE INVENTION

This invention relates to a process for preparing adhesive compositions by free radical polymerization.

BACKGROUND OF THE INVENTION

Adhesives such as pressure sensitive adhesives can be prepared using a variety of polymerization methods, including solution, emulsion, and bulk polymerization. An example of a bulk polymerization process is a free radical photopolymerization process in which ultraviolet radiation is used to initiate polymerization.

One problem with traditional on-web polymerization methods for preparing adhesives is that it is difficult to prepare relatively thick adhesives at a rate suitable for commercial production. In the case of solution and emulsion polymerizations, the low viscosity of the polymerizable composition limits the thickness of any one layer that can be prepared, requiring multiple coating, polymerizing, and drying steps to build thick adhesives layer by layer.

In free radical ultraviolet radiation-initiated processes, the polymerization rate is a function of the illumination intensity and the fraction of light absorbed by the photoinitiator at each wavelength. Typical ultraviolet light sources used for polymerization emit broad band radiation with relatively low intensity at any one wavelength.

To compensate for the low intensity and achieve a reasonable polymerization rate, it is necessary to increase the fraction of light absorbed, either by increasing the initiator concentration or by increasing the absorption coefficient of the initiator at the wavelengths provided by the source. However, increasing the absorbance results in an increased cure gradient throughout the thickness of the coating, with the top layers being cured to a greater extent than the lower layers. This is especially detrimental in the case of relatively thick coatings (e.g., on the order of 2 mils or greater).

It has been suggested to use monochromatic radiation having a peak intensity at 222 nanometers as a light source. Such radiation, however, is not optimal for polymerization of thick acrylic samples because both the unsaturated acrylate monomers and the acrylate polymer absorb at this wavelength, thereby decreasing the amount of light available to initiate polymerization.

SUMMARY OF THE INVENTION

In a first aspect, the invention features a method of preparing an adhesive composition (e.g., a pressure sensitive adhesive or hot melt adhesive composition) that includes exposing a free-radically polymerizable pre-adhesive composition to a monochromatic radiation source having a peak intensity at a wavelength falling within the range of about 250 to about 600 nanometers to polymerize the pre-adhesive composition and form the adhesive composition. By "monochromatic" it is meant that the source emits at least about 50 percent, preferably at least 60 percent and most preferably at least 70 percent of its actinic radiation within a spectral band having a half width of no more than about 40 nanometers, preferably no more than about 30 nanometers, and most preferably no more than about 25 nanometers. Thus, for example, a monochromatic radiation source having a peak intensity at a value of about 308 nanometers would emit radiation over a narrow spectral range centered around 308 nanometers.

The polymerizable pre-adhesive composition includes a free radical photoinitiator. The amount of the photoinitiator preferably is no greater than about 5 parts by weight, more preferably no greater than about 2 parts by weight.

The polymerizable pre-adhesive composition preferably includes a triazine crosslinking agent having a peak absorption at a wavelength corresponding to the wavelength at which the monochromatic radiation source exhibits peak intensity. In the case of radiation sources having a peak intensity at about 308 nm, the triazine preferably has a peak absorption at a wavelength no greater than about 320 nanometers, preferably no greater than about 310 nanometers. Examples of preferred triazines when the radiation source is selected to have a peak intensity at about 308 nanometers are those selected from the group consisting of bis(trichloromethyl)phenyl-s-triazine and bis(trichloromethyl)4methylphenyl-s-triazine.

The pre-adhesive composition may also include a crosslinking agent that is insensitive to radiation from the monochromatic radiation source. Such agents are generally activated subsequent to polymerization, e.g., by exposure to heat and/or radiation having a wavelength or wavelengths (in the case of broad band sources) different from the wavelength of the monochromatic source used for polymerization.

Preferred polymerizable pre-adhesive compositions are essentially solvent-free. One example of a preferred polymerizable pre-adhesive composition includes (a) 50 to 100 parts by weight of an acrylic or methacrylic ester of a non-tertiary alkyl alcohol in which the alkyl group contains up to about 20 carbon atoms, and (b) 0 to 50 parts by weight of a modifying monomer, other than the acrylic or methacrylic ester, which is copolymerizable with the acrylic or methacrylic ester.

The radiation source preferably has a peak intensity at a wavelength falling within the range of about 300 to about 360 nanometers, more preferably about 308 nanometers. An example of a preferred radiation source is an excimer lamp, e.g., a xenon chloride excimer lamp.

In a second aspect, the invention features a pressure sensitive adhesive composition that includes the polymerization product of (a) 50 to 100 parts by weight of an acrylic or methacrylic ester of a non-tertiary alkyl alcohol in which the alkyl group contains between 1 and 20 carbon atoms, inclusive, (b) 0 to 50 parts by weight of a modifying monomer, other than the acrylic or methacrylic ester, which is copolymerizable with said acrylic or methacrylic ester, (c) a free radical photoinitiator, and (d) a triazine crosslinking agent having a peak absorption at a wavelength of about 320 nanometers or less.

The invention provides a free radical photopolymerization process for preparing adhesives in which the illumination intensity of the monochromatic source, coupled with the absorption of the photoinitiator at the wavelength provided by the source, is sufficiently high such that relatively thick samples can be prepared without using long exposure times. Using such a radiation source minimizes formation of a cure gradient throughout the coating thickness and makes it possible to use low levels of photoinitiator while maintaining an acceptable polymerization rate.

Other features and advantages of the invention will be apparent from the following description of the preferred embodiments thereof, and from the claims.

DETAILED DESCRIPTION OF PREFERRED EMBODIMENTS

Free-radically polymerizable pre-adhesive compositions are exposed to a monochromatic radiation source having a peak intensity at a wavelength falling within the range of about 250 nanometers to about 600 nanometers to polymerize the pre-adhesive composition and form an adhesive composition (e.g., a pressure sensitive or hot melt adhesive composition). Examples of suitable pre-adhesive compositions include (a) 50 to 100 parts by weight of an acrylic or methacrylic ester of a non-tertiary alkyl alcohol in which the alkyl group contains up to about 20 carbon atoms, and (b) 0 to 50 parts by weight of a modifying monomer, other than the acrylic or methacrylic ester, which is copolymerizable with the acrylic or methacrylic ester.

Examples of suitable acrylic and methacrylic ester monomers include methyl acrylate, ethyl acrylate, n-butyl acrylate, hexyl acrylate, lauryl acrylate, 2-ethyl hexyl acrylate, 2-ethyl butyl acrylate, iso-nonyl acrylate, octadecyl acrylate, nonyl acrylate, decyl acrylate, and dodecyl acrylate.

One class of useful co-monomers includes those having a homopolymer glass transition temperature greater than the glass transition temperature of the acrylate or methacrylate homopolymer. Examples of co-monomers falling within this class include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobomyl acrylate, cyano ethyl acrylate, N-vinyl caprolactam, maleic anhydride, hydroxyalkyl acrylates (e.g., 2-hydroxy ethyl acrylate), N,N-dimethyl aminoethyl (meth)acrylate, N,N-diethylacrylamide, beta-carboxyethyl acrylate, vinyl esters of neodecanoic neononanoic, neopentanoic, 2-ethylhexanoic, or propionic acids (e.g., available from Union Carbide Corp. of Danbury, Conn. under the designation "Vynates"), vinylidene chloride, styrene, vinyl toluene, and alkyl vinyl ethers. Also useful are aromatic acrylates and methacrylates, e.g., benzyl acrylate and cyclobenzyl acrylate.

A second class of useful co-monomers includes those having a homopolymer glass transition temperature less than the glass transition temperature of the acrylate or methacrylate homopolymer. Examples of suitable co-monomers falling within this class include ethoxyethoxy acrylate (Tg=−71 EC) and methoxypolyethylene glycol 400 acrylate (Tg=−65EC; available from Shin Nakamura Chemical Co., Ltd. under the designation "NK Ester AM-90G").

One or more crosslinking agents may be included as well. The amount of crosslinking agent typically ranges from about 0.001 to about 5 parts by weight per hundred parts acrylate or methacrylate monomer.

One class of suitable crosslinking agents includes agents that copolymerize with the free radically polymerizable monomers and co-monomers described above. Included within this class are multi-functional monomers. The term "multi-functional" as used herein refers to monomers that have two or more free radically polymerizable, ethylenically unsaturated groups. Examples of useful multi-functional monomers include acrylic or methacrylic esters of diols such as butanediol and hexanediol, triols such as glycerol, and tetraols such as pentaerythritol. Other useful multifunctional crosslinking monomers include polymeric multifunctional (meth)acrylates, e.g., poly(ethylene oxide) diacrylate or poly (ethylene oxide) dimethacrylate; polyvinylic crosslinking agents such as substituted and unsubstituted divinylbenzene; and difunctional urethane acrylates such as "EBECRYL" 270 and "EBECRYL" 230 (1500 weight average molecular weight and 5000 weight average molecular weight acrylated urethanes, respectively—both available from UCB of Smyrna, Ga.), and combinations thereof.

Also included within the class of copolymerizable crosslinking agents are co-monomers containing functional groups that are activated subsequent to polymerization, either by exposure to heat or to radiation having a wavelength or wavelengths (in the case of broad band sources) different from the wavelength of the monochromatic source used for polymerization. Such co-monomers are particularly useful for preparing hot melt adhesives, where the polymer prepared by exposing a pre-adhesive composition to monochromatic radiation is melted in an extruder, coated onto a substrate, and then crosslinked by activating the functional groups of the co-monomer. Examples of suitable co-monomers include p-acryloxybenzophenone, p-acryloxyethoxybenzophenone, p-N-(methylacryloxyethyl)-carbamoylethoxybenzophenone, p-acryloxyacetophenone, o-acrylamidoacetophenone, and combinations thereof.

A second class of crosslinking agents includes agents that are not copolymerizable with the monomeric components. As in the case of certain of the copolymerizable monomers, these agents may be activated at the same or different wavelength from the wavelength used for polymerization.

Preferred crosslinking agents falling within this second class are triazines that have a peak absorption at a wavelength corresponding to the wavelength at which the monochromatic radiation source exhibits peak intensity. Examples of preferred triazines when the radiation source is selected to have a peak intensity at about 308 nanometers include bis(trichloromethyl)phenyl-s-triazine and bis (trichloromethyl)-4-methylphenyl-s-triazine.

A photoinitiator is included in the monomer mixture as well. Useful photoinitiators include substituted acetophenones such a benzyl dimethyl ketal and 1-hydroxycyclohexyl phenyl ketone, substituted alphaketols such as 2-methyl-2-hydroxypropiophenone, benzoin ethers such as benzoin methyl ether, benzoin isopropyl ether, substituted benzoin ethers such as anisoin methyl ether, substituted acetophenones such as 2,2-diethoxyacetophenone and 2,2-dimethoxy-2-phenylacetophenone, aromatic sulfonyl chlorides such as 2-naphthalene sulfonyl chloride, and photoactive oximes such as 1-phenyl-1 ,2-propanedione-2-(O-ethoxycarbonyl)-oxime. The photoinitiator may also act as a crosslinking agent. The amount of photoinitiator typically ranges from about 0.001 to about 5.0 parts by weight per 100 parts of total monomer, preferably from about 0.001 to about 2.0 parts by weight, and more preferably from about 0.01 to about 1.0 parts by weight.

Other materials which may be added to the monomer mixture include chain transfer agents for controlling molecular weight (e.g., carbon tetrabromide, mercaptans, or alcohols), tackifiers, plasticizers (e.g., polyethylene glycol, polypropylene glycol, or glycerin), pigments, glass or polymeric bubbles or beads (which may be expanded or unexpanded), fibers, reinforcing agents, hydrophobic or hydrophilic silica, calcium carbonate, toughening agents, fire retardants, antioxidants, finely ground polymeric particles such as polyester, nylon, and polypropylene, and stabilizers. These additives, and amounts thereof, are selected such that they do not significantly interfere with the ability of the photoinitiator to absorb the monochromatic radiation.

The compositions are prepared by photoinitiated bulk polymerization. The polymerizable monomers and photoinitiator are mixed together in the absence of solvent and, if desired, partially polymerized to a viscosity in the range of from about 500 cps to about 50,000 cps to achieve a pre-adhesive composition in the form of a coatable syrup. The crosslinking agent (if present) and any other ingredients are then added to the prepolymerized syrup. Alternatively, these ingredients (with the exception of the crosslinking agent) can be added directly to the monomer mixture prior to pre-polymerization. The partial polymerization step may also be omitted, and the monomeric composition used directly.

The pre-adhesive or monomeric composition is coated onto a substrate (which may be transparent to ultraviolet radiation) using conventional coating methods such as knife coating, roll coating, and (in the case of relatively high viscosity compositions) extrusion or die coating, and polymerized in an inert (i.e., substantially oxygen-free) atmosphere, e.g., a nitrogen atmosphere, by exposure to monochromatic radiation. Examples of suitable substrates include release liners (e.g., silicone release liners) and paper, polymeric non-woven tape backings. A sufficiently inert atmosphere can also be achieved by covering a layer of the polymerizable coating with a plastic film which is substantially transparent to the monochromatic radiation, and irradiating through that film in air.

The thickness of the coating will depend upon the intended use of the adhesive. An advantage of using monochromatic radiation having a peak intensity in the range 250 to 600 nanometers is that relatively thick coatings (e.g., having thickness values on the order of about 2 mils or higher) can be prepared in reasonable amounts of time, thereby making the process useful for commercial scale adhesive production.

Where multi-layer constructions are desirable, one method of construction is multi-layer coating using conventional techniques. For example, the coatings may be applied concurrently (e.g., through a die coater), after which the entire multi-layer structure is cured all at once. The coatings may also be applied sequentially whereby each individual layer is partially or completely cured prior to application of the next layer.

Useful radiation sources are monochromatic radiation sources having a peak intensity in the region between about 250 nanometers to about 600 nanometers, more preferably between about 300 and about 360 nanometers. Examples of suitable radiation sources include coherent ultraviolet radiation sources such as excimer lasers and incoherent ultraviolet radiation sources such as excimer lamps, with excimer lamps being preferred. Excimer lamps are commercially available from Heraeus Noblelight (Hanau, Germany) and Fusion Curing Systems, Inc. (Gaithersburg, Md.), and have been described in the following references: International Patent Application No. WO 94/14853; German Patent Application No. DE 4,302,555 A1 (assigned to Fusion Systems, Inc.); Kitamura et al., *Applied Surface Science*, 79/80 (1994), 507–513; Kogelschatz et al., *ABB Review*, 3 (1991), 21–28; Kogelschatz et al., *Applied Surface Science*, 54 (1992), 410–423; and Zhang et al., *Journal of Adhesion Science and Technology*, 8(10) (1994), 1179–1210. A particularly useful radiation source is a xenon-chloride excimer lamp commercially available from Heraeus Noblelight having a peak intensity of about 308 nanometers.

The intensities of incoherent (i.e., non-laser) incident radiation generally range from about 1 to about 2,000 mW/cm$^2$, preferably from about 5 to about 1,000 mW/cm$^2$, and more preferably from about 10 to about 200 mW/cm$^2$. When laser-based excimer radiation sources are used, the intensities tend to be significantly higher; thus, it may be desirable to employ an optical device such as a lens to diffuse or spread the laser output to increase the effective irradiated area and reduce the energy density of the laser beam.

The invention will now be described further by way of the following examples. All parts are by weight unless otherwise indicated.

EXAMPLES

Test Procedures

Percent Conversion

A square sample measuring 3.2 cm×3.2 cm was cut from the polymerized product and weighed. The sample was then heated in air for two hours at 100° C., after which it was weighed again. The percent conversion was calculated as follows: % Conversion=100—[(Weight Loss×100)/(Weight before heating—Backing weight)].

Gel Fraction

A sample was weighed, placed in an excess of ethyl acetate solvent for 24 hours, and then filtered. The recovered solid was dried and weighed. The gel fraction was calculated by dividing the weight of the dried solid by the initial weight of the adhesive coating. Results are reported as an average of two numbers.

Static Shear

Shear strength is a measure of the cohesiveness or internal strength of an adhesive. It is measured as the time in minutes required to pull a standard area of adhesive-coated sheet material from a stainless steel test panel under a constant applied stress. This test follows the procedure described in ASTM D 364M-88 entitled "Holding Power of Pressure Sensitive Adhesive Tapes."

The tests were conducted at room temperature (about 22° C.) on strips of adhesive-coated sheet material applied to a stainless steel panel which had previously been cleaned using, in order, (1) toluene, (2) heptane, and (3) 50% isopropanol/water. A 0.127 dm by 0.127 dm portion of each strip was placed in firm contact with the panel, with the end portion of each strip remaining free. The adhesive strip-containing panel was held nearly vertical in a rack such that the panel formed an angle of 178° relative to the extended free end of the adhesive strip. The strip was then tensioned by applying a force of 1000 grams as a hanging weight from the free end of the strip. The amount of time elapsed before the adhesive strip separated from the test panel was recorded as the static shear strength. The test was discontinued after 10,000 minutes, this value representing good shear strength. The results are reported as an average of two samples.

High Temperature Static Shear

The test protocol was the same as described above for "static shear" except that the test samples were aged at 70° C. for 15 minutes prior to testing. In addition, the tests were conducted at 70° C. The results are reported as an average of two samples.

Example 1

A partially polymerized pre-adhesive composition was prepared by exposing a de-gassed blend of 90 parts isooctyl acrylate, 10 parts acrylic acid, and 0.04% Esacure KB-1 photoinitiator (available from Sartomer of Exton, Pa.) to ultraviolet radiation until a viscous, partially polymerized, pre-adhesive composition was formed. The partially polymerized pre-adhesive composition was coated onto a polyethylene terephthalate substrate at a thickness of 0.005 cm using a knife coater. The coated substrate was then placed into a nitrogen-inerted cure chamber in which the oxygen level was less than 50 ppm and then passed through an illumination zone provided by a xenon chloride excimer lamp (Heraeus Model 308, available from Heraeus Noblelight, Hanau, Germany). The lamp was separated from the cure chamber by a quartz window essentially transparent to the wavelength of the lamp and situated lengthwise above the cure chamber to provide an irradiated area through which the coated substrate was transported. The irradiated area measured about 25 cm in the downweb direction by 7.5 cm in the crossweb direction. Line speed was adjusted to provide a residence time in the illumination zone of approximately 60 seconds. The total illumination energy incident on the coating was about 3 J/cm$^2$.

Upon exiting the cure chamber, the partially polymerized pre-adhesive composition had polymerized to form a tacky pressure sensitive adhesive. The gel fraction of the adhesive was less than 10%. The percent conversion was on the order of 98–99%.

Examples 2–7

The procedure of Example 1 was followed except that following preparation of the partially polymerized pre-adhesive composition, an additional amount of photoinitiator (0.15% Darocur 1173 from Ciba Additives) and varying amounts of 1,6-hexanediol diacrylate crosslinking agent ("HDDA," available under the designation "SR238" from Sartomer of Exton, Pa.) were added to the partially polymerized pre-adhesive composition. Table 1 shows the gel fraction of the adhesive product as a function of HDDA concentration.

TABLE 1

| Example No. | % HDDA | % Gel |
| --- | --- | --- |
| 2 | 0.0 | 1.34 |
| 3 | 0.05 | 0.81 |
| 4 | 0.10 | 37.68 |
| 5 | 0.15 | 70.78 |
| 6 | 0.20 | 84.73 |
| 7 | 0.25 | 87.47 |

Examples 8–16

The procedure of Examples 2–7 was followed except that varying amounts of 4-methylphenyl-s-triazine were added to the partially polymerized pre-adhesive composition, rather than HDDA. In addition, the residence time in the illumination zone was selected to be 15, 30, or 60 seconds. The gel fraction and percent conversion associated with the adhesive product were determined and are reported in Table 2.

TABLE 2

| Example No. | Residence Time, sec | % Triazine | % Gel | % Conversion |
| --- | --- | --- | --- | --- |
| 8 | 60 | 0.05 | 82.15 | 98.8 |
| 9 | 60 | 0.10 | 82.96 | 97.2 |
| 10 | 60 | 0.15 | 88.06 | 99.3 |
| 11 | 30 | 0.05 | 76.05 | 97.4 |
| 12 | 30 | 0.10 | 77.90 | 96.3 |
| 13 | 30 | 0.15 | 83.00 | 98.3 |
| 14 | 15 | 0.05 | 64.98 | 93.3 |
| 15 | 15 | 0.10 | 56.00 | 89.6 |
| 16 | 15 | 0.15 | 72.57 | 94.8 |

Examples 17–25

The procedure of Examples 8–16 was followed except that varying amounts of phenyl-s-triazine were added to the partially polymerized pre-adhesive composition, rather than 4-methylphenyl-s-triazine. The gel fraction and percent conversion associated with the adhesive product were determined and are reported in Table 3.

TABLE 3

| Example No. | Residence Time, sec | % Triazine | % Gel | % Conversion |
| --- | --- | --- | --- | --- |
| 17 | 60 | 0.05 | 69.32 | 99.3 |
| 18 | 60 | 0.10 | 80.93 | 96.7 |
| 19 | 60 | 0.15 | 89.05 | 99.3 |
| 20 | 30 | 0.05 | 56.74 | 97.3 |
| 21 | 30 | 0.10 | 76.15 | 96.0 |
| 22 | 30 | 0.15 | 85.20 | 98.5 |
| 23 | 15 | 0.05 | 32.67 | 87.7 |
| 24 | 15 | 0.10 | 63.61 | 90.8 |
| 25 | 15 | 0.15 | 75.39 | 95.2 |

Examples 26–28

The procedure of Examples 8–16 was followed except that 0.15% 4-methylphenyl-s-triazine was added to the partially polymerized pre-adhesive composition. In addition, the pre-adhesive composition was coated onto a release liner in the form of a 0.005 cm thick coating. The oxygen level inside the curing chamber was less than 10 ppm. The gel fraction, static shear strength ("RT Static Shear"), and high temperature static shear strength ("HT Static Shear") of the adhesive product were determined and are reported in Table 4.

TABLE 4

| Example No. | Residence Time, sec | % Gel | HT Static Shears, min | RT Static Shears, min |
| --- | --- | --- | --- | --- |
| 26 | 60 | 88.86 | 10,000 | 10,000 |
| 27 | 30 | 89.55 | 10,000 | 10,000 |
| 28 | 15 | 76.82 | 10,000 | 10,000 |

Examples 29–31

The procedure of Examples 26–28 was followed except that 0.15% phenyl-s-triazine was added to the partially polymerized pre-adhesive composition. The gel fraction, static shear strength ("RT Static Shear"), and high temperature static shear strength ("HT Static Shear") of the adhesive product were determined and are reported in Table 5.

TABLE 5

| Example No. | Residence Time, sec | % Gel | HT Static Shears, min | RT Static Shears, min |
| --- | --- | --- | --- | --- |
| 29 | 60 | 85.80 | 10,000 | 10,000 |
| 30 | 30 | 84.49 | 10,000 | 10,000 |
| 31 | 15 | 73.88 | 10,000 | 10,000 |

Example 32

The procedure of Example 1 was followed except that 0.04% Irgacure 651 (Ciba Additives) was used as the photoinitiator instead of KB-1. Following preparation of the partially polymerized pre-adhesive composition, 0.1% of the chain transfer agent $CBr_4$ and 0.1% of the light-activatable crosslinker acryloxybenzophenone were added to the partially polymerized pre-adhesive composition. The resulting composition was coated onto a release liner at a thickness of 0.25 cm. Exposure to the xenon chloride excimer lamp yielded an adhesive having a gel content of less than 5%. The adhesive was then removed from the release liner and hot melt coated onto a 0.005 cm thick polyethylene terephthalate backing, after which it was exposed to a medium pressure mercury arc lamp to induce crosslinking. The crosslinked adhesive had a gel content of greater than 80% and exhibited enhanced shear performance relative to the uncrosslinked adhesive.

Example 33

Two sheets of ethylene vinyl acetate film (VA24 from Consolidated Thermoplastics Co. of Schaumburg, Ill.), each measuring about 0.0635 mm thick, were heat sealed together along the lateral edges and the bottom to form a rectangular pouch. The pouch was then filled with a composition having 90 parts isooctyl acrylate, 10 parts acrylic acid, 0.15 parts Irgacure 651 photoinitiator, 0.04 parts isooctylthioglycolate, and 0.1 parts acryloxybenzophenone, after which the pouch was heat sealed at the top in the cross direction. Next, the pouch was immersed in a water bath maintained at about 25° C. and positioned about 5 cm below the xenon chloride excimer lamp described in Example 1 for a period of 5 minutes to polymerize the contents of the pouch. Measurement of the gel content of the polymerized adhesive material showed low gel levels. Subsequent exposure to a medium pressure mercury lamp of a coating made from the adhesive composition crosslinked the adhesive as reflected by an increase in gel content.

Other embodiments are within the following claims.

I claim:

1. A method of preparing an adhesive composition comprising exposing a free-radically polymerizable pre-adhesive composition to a monochromatic radiation source having a peak intensity at a wavelength falling within the range of about 250 nanometers to about 600 nanometers to polymerize said pre-adhesive composition and form said adhesive composition.

2. A method according to claim 1 wherein said polymerizable pre-adhesive composition comprises a free radical photoinitiator in an amount no greater than about 5 parts by weight.

3. A method according to claim 1 wherein said polymerizable pre-adhesive composition comprises a free radical photoinitiator in an amount no greater than about 2 parts by weight.

4. A method according to claim 1 wherein said polymerizable pre-adhesive composition comprises a triazine crosslinking agent.

5. A method according to claim 4 wherein said triazine has a peak absorption at a wavelength no greater than about 320 nanometers.

6. A method according to claim 4 wherein said triazine has a peak absorption at a wavelength no greater than about 310 nanometers.

7. A method according to claim 4 wherein said triazine is selected from the group consisting of bis(trichloromethyl)phenyl-s-triazine and bis(trichloromethyl)-4-methylphenyl-s-triazine.

8. A method according to claim 1 wherein said polymerizable pre-adhesive composition is essentially solvent-free.

9. A method according to claim 1 wherein said adhesive composition comprises a pressure sensitive adhesive.

10. A method according to claim 1 wherein said adhesive composition comprises a hot melt adhesive.

11. A method according to claim 1 wherein said radiation source comprises an excimer lamp.

12. A method according to claim 1 wherein said radiation source has a peak intensity at a wavelength falling within the range of about 300 to about 360 nanometers.

13. A method according to claim 1 wherein said radiation source has a peak intensity at a wavelength of about 308 nanometers.

14. A method according to claim 1 wherein said radiation source comprises a xenon chloride excimer lamp.

15. A method according to claim 1 wherein said polymerizable pre-adhesive composition comprises a crosslinking agent substantially insensitive to radiation from said radiation source.

16. A method according to claim 1 wherein said polymerizable pre-adhesive composition comprises (a) 50 to 100 parts by weight of an acrylic or methacrylic ester of a non-tertiary alkyl alcohol in which the alkyl group up to about 20 carbon atoms, and (b) 0 to 50 parts by weight of a modifying monomer, other than said acrylic or methacrylic ester, copolymerizable with said acrylic or methacrylic ester.

17. A method of preparing a pressure sensitive adhesive composition comprising exposing a free-radically polymerizable pre-adhesive composition to a monochromatic radiation source having a peak intensity at a wavelength falling within the range of about 300 nanometers to about 360 nanometers to form said pressure sensitive adhesive composition, said polymerizable pre-adhesive composition comprising
(a) 50 to 100 parts by weight of an acrylic or methacrylic ester of a non-tertiary alkyl alcohol in which the alkyl group contains up to about 20 carbon atoms, (b) 0 to 50 parts by weight of a modifying monomer, other than said acrylic or methacrylic ester, copolymerizable with said acrylic or methacrylic ester, and (c) no greater than 5 parts by weight, based upon 100 parts of (a) plus (b), of a free radical photoinitiator.

18. A method according to claim 17 wherein said radiation source comprises an excimer lamp.

19. A method of preparing an adhesive composition comprising exposing a free-radically polymerizable pre-adhesive composition to a monochromatic radiation source having a peak intensity at a wavelength falling within the range of about 250 nanometers to about 600 nanometers to polymerize said polymerizable pre-adhesive composition, said polymerizable pre-adhesive composition comprising a triazine crosslinking agent having a peak absorption at a wavelength corresponding to the wavelength at which said monochromatic radiation source exhibits a peak intensity.

20. A method according to claim 19 wherein said triazine has a peak absorption at a wavelength no greater than about 320 nanometers.

21. A method according to claim 19 wherein said triazine has a peak absorption at a wavelength no greater than about 310 nanometers.

22. A method according to claim 19 wherein said triazine is selected from the group consisting of bis(trichloromethyl)phenyl-s-triazine and bis(trichloromethyl)-4-methylphenyl-s-triazine.

23. A method according to claim 19 wherein said radiation source has a peak intensity at a wavelength falling within the range of about 300 to about 360 nanometers.

24. A method according to claim 19 wherein said adhesive composition comprises a pressure sensitive adhesive composition.

25. A method according to claim 19 wherein said adhesive composition comprises a hot melt adhesive composition.

26. A pressure sensitive adhesive composition comprising the polymerization product of (a) 50 to 100 parts by weight of an acrylic or methacrylic ester of a non-tertiary alkyl alcohol in which the alkyl group contains up to about 20 carbon atoms, (b) 0 to 50 parts by weight of a modifying monomer, other than said acrylic or methacrylic ester, copolymerizable with said acrylic or methacrylic ester, (c) a free radical photoinitiator, and (d) a triazine crosslinking agent having a peak absorption at a wavelength no greater than about 320 nanometers.

27. A method according to claim 9 wherein said polymerizable pre-adhesive composition comprises a free radical photoinitiator in an amount no greater than about 5 parts by weight.

28. A method according to claim 9 wherein said polymerizable pre-adhesive composition comprises a triazine crosslinking agent having a peak absorption at a wavelength corresponding to the wavelength at which said monochromatic radiation source exhibits a peak intensity.

29. A method according to claim 28 wherein said triazine has a peak absorption at a wavelength no greater than about 320 nanometers.

30. A method according to claim 28 wherein said triazine has a peak absorption at a wavelength no greater than about 310 nanometers.

31. A method according to claim 28 wherein said triazine is selected from the group consisting of bis(trichloromethyl) phenyl-s-triazine and bis(trichloromethyl)4 methylphenyl-s-triazine.

32. A method according to claim 9 wherein said radiation source comprises an excimer lamp.

33. A method according to claim 9 wherein said radiation source has a peak intensity at a wavelength falling within the range of about 300 to about 360 nanometers.

* * * * *

UNITED STATES PATENT AND TRADEMARK OFFICE
CERTIFICATE OF CORRECTION

PATENT NO. : 6,040,352
DATED : March 21, 2000
INVENTOR(S) : Robin E. Wright

It is certified that error appears in the above-identified patent and that said Letters Patent is hereby corrected as shown below:

Column 2,
Line 16: "(trichloromethyl)4methylphenyl-s-triazine." should read
-- (trichloromethyl)-4-methylphenyl-s-triazine.--

Column 3,
Line 15: "acrylate, iso-nonyl acrylate," should read
-- acrylate, cyclohexyl acrylate, iso-octyl acrylate, iso-nonyl acrylate,
Line 25: "isobomyl" should read -- isobornyl --

Column 10,
Line 16: "the alkyl group up to" should read --the alkyl group contains up to --

Column 12,
Line 9: "bis(trichloromethyl)4methylphenyl-s-triazine." should read
-- bis(trichloromethyl)-4-methylphenyl-s-triazine. --

Signed and Sealed this

Nineteenth Day of June, 2001

*Attest:*

NICHOLAS P. GODICI
*Attesting Officer*   *Acting Director of the United States Patent and Trademark Office*